US007954133B2

(12) United States Patent
Stavenow et al.

(10) Patent No.: US 7,954,133 B2
(45) Date of Patent: May 31, 2011

(54) DIGITAL LIVING NETWORK ALLIANCE (DLNA) ENABLED PORTABLE ELECTRONIC DEVICES, DLNA MANAGEMENT CONSOLES AND RELATED METHODS OF OPERATING DLNA ENABLED PORTABLE ELECTRONIC DEVICES (75) Inventors: Bengt Gunnar Stavenow, Lund (SE); Bo Hakan Larsson, Malmo (SE); Jan Robert Tobias Ritzau, Veberod (SE); Henrik Sven Bengtsson, Lund (SE); Anders Wilhelm Ostsjo, Bjarred (SE); Sten Hakan Minor, Lund (SE)

(73) Assignee: Sony Ericsson Mobile Communications AB, Lund (SE)

( * ) Notice: Subject to any disclaimer, the term of this patent is extended or adjusted under 35 U.S.C. 154(b) by 607 days.

(21) Appl. No.: 12/024,353

(22) Filed: Feb. 1, 2008

(65) Prior Publication Data
US 2009/0106414 A1 Apr. 23, 2009

Related U.S. Application Data (60) Provisional application No. 60/981,569, filed on Oct. 22, 2007.

(51) Int. Cl.
*H04N 17/173* (2006.01)
(52) U.S. Cl. ........ 725/141; 725/135; 725/146; 725/153; 709/223
(58) Field of Classification Search .................. 709/223, 709/224, 250, 220; 370/235, 315; 725/133, 725/78, 141, 135, 146, 153; 386/68; 375/240.28; 707/3; 717/107; 719/318
See application file for complete search history.

(56) References Cited

U.S. PATENT DOCUMENTS

| 2006/0020589 | A1* | 1/2006 | Wu et al. .......................... 707/3 |
| 2007/0002784 | A1* | 1/2007 | Edwards ....................... 370/315 |
| 2007/0058730 | A1* | 3/2007 | Bowra et al. ............. 375/240.28 |
| 2007/0211734 | A1 | 9/2007 | Yang et al. |
| 2007/0237115 | A1 | 10/2007 | Bae et al. |
| 2007/0238471 | A1 | 10/2007 | Bae et al. |
| 2008/0092199 | A1* | 4/2008 | McCarthy et al. ............ 725/133 |
| 2008/0109823 | A1* | 5/2008 | Whitfield et al. ............. 719/318 |
| 2008/0127063 | A1* | 5/2008 | Silva et al. .................... 717/107 |
| 2008/0229370 | A1* | 9/2008 | Zustak et al. ................... 725/78 |
| 2009/0028047 | A1* | 1/2009 | Schmidt et al. ............... 370/235 |
| 2009/0087162 | A1* | 4/2009 | Qiu et al. ........................ 386/68 |

OTHER PUBLICATIONS

International Search Report, PCT/EP2008/054452, Sep. 30, 2008.
Communication pursuant to Article 94(3) EPC, EP Application No. 08 749 546.1, Issued Sep. 23, 2010, 6 pages.

* cited by examiner

*Primary Examiner* — Le Luu
(74) *Attorney, Agent, or Firm* — Myer Bigel Sibley & Sajovec (57) ABSTRACT Digital living network alliance (DLNA) enabled portable electronic devices are provided that include a DLNA device circuit and a DLNA management console circuit. The DLNA device circuit is configured to attach the portable electronic device to an existing DLNA network having at least one existing DLNA management console so as to allow the portable electronic device to be a source for data on the existing DLNA network. The DLNA management console circuit is configured to enable the portable electronic device to operate as a portable management console for the existing and/or a new DLNA network. Related management consoles and methods of operating DLNA enabled portable electronic devices are also provided.

20 Claims, 5 Drawing Sheets

DIGITAL LIVING NETWORK ALLIANCE (DLNA) ENABLED PORTABLE ELECTRONIC DEVICES, DLNA MANAGEMENT CONSOLES AND RELATED METHODS OF OPERATING DLNA ENABLED PORTABLE ELECTRONIC DEVICES

CLAIM OF PRIORITY

The present application claims priority from U.S. Provisional Application No. 60/981,569, filed Oct. 22, 2007, the disclosure of which is hereby incorporated herein by reference as if set forth in its entirety.

FIELD OF THE INVENTION

The present invention relates to portable electronic devices, and, more particularly, to Digital Living Network Alliance (DLNA) enabled portable electronic devices.

BACKGROUND OF THE INVENTION

Recently, wireless data, entertainment and mobile communications technologies have become increasingly prevalent, particularly in the household and computing environment. The convergence of these communications within the home and elsewhere has created a market for merging many disparate devices into wireless network architectures capable of seamlessly supporting and integrating the requirements of all of these devices. Seamless connectivity and rapid transfer of data, without confusing cables and wires for various interfaces that will not and cannot talk to each other, is a compelling proposition for a broad market.

To that end, communication industry consortia, such as the MultiBand OFDM Alliance (MBOA), Digital Living Network Alliance (DLNA) and the WiMedia Alliance are establishing design guidelines and standards to provide interoperability of these wireless devices. For example, Wireless 1394, Wireless USB, and native IP-based applications are being development based on ultra wideband (UWB) radio or WiMedia Convergence Platform.

In particular, the Digital Living Network Alliance (DLNA) is an international, cross-industry collaboration of consumer electronics, computing industry and mobile device companies. The main objective of DLNA is the establishment of a wired and wireless interoperable network of Personal Computers (PC), Consumer Electronics (CE) and mobile devices in the home and on the road, which may enable a seamless environment for sharing new digital media and content services. DLNA is focused on delivering an interoperability framework of design guidelines based on internationally recognized open industry standards together with a certification/logo program to officially verify and validate the conformance and interoperability of compliant products for the consumers.

DLNA defines three types of roles for devices in the DLNA network, a digital media renderer role, a digital media controller (control point) role and a digital media server role. A device having the digital media server role is a component capable of storing and sourcing media. A device that may have the digital media server role may be, for example, a set-top-box, a digital video recorder, or a personal computer (PC). A device having a digital media rendered role may be configured to show to the user the content provided to it by other devices. Devices configured as digital media controllers (control point role) can initiate activities as a third-party controller, for example, start the display of a media from a digital media server device on a digital media renderer device, i.e. control point devices are configrued to control how and where to render content that is provided by the server. A device can naturally assume one or more roles. For example, a device that is configured as both the renderer role and the control point may be termed a digital media player. Digital media players can acquire media from a digital media server and play (render) it to the user. A digital media player may be, for example, a television or a home theater system.

SUMMARY OF THE INVENTION

Some embodiments of the present invention provide a digital living network alliance (DLNA) enabled portable electronic device that includes a DLNA device circuit and a DLNA management console circuit. The DLNA device circuit is configured to attach the portable electronic device to an existing DLNA network having at least one existing DLNA management console so as to allow the portable electronic device to be a source for data on the existing DLNA network. The DLNA management console circuit is configured to enable the portable electronic device to operate as a portable management console for the existing and/or a new DLNA network.

In further embodiments of the present invention, the DLNA device circuit may be further configured to transmit a request to the existing management console requesting that the portable electronic device be attached to the existing DLNA network as a DLNA device. The DLNA management console circuit may be further configured to transmit a request to the existing management console requesting that the portable electronic device be given rights to act as a secondary management console for the existing DLNA network once the portable electronic device has been attached to the existing DLNA network as a DLNA device.

In still further embodiments of the present invention, the existing DLNA network may be managed from the existing management console and/or the secondary management console.

In some embodiments of the present invention, the DLNA management console circuit may be further configured to attach to the existing DLNA network from a location remote from the existing DLNA network and manage the existing DLNA network from the remote location. The DLNA management console circuit may be configured to attach to the existing DLNA network from the remote location over the Internet using a wireless network and a DLNA proxy.

In further embodiments of the present invention, the DLNA management console circuit may be configured to define the new DLNA network including the DLNA enabled portable electronic device. The DLNA management console circuit may be the portable management console for the new DLNA network.

In still further embodiments of the present invention, the DLNA management console may be further configured to receive requests to attach to the new DLNA network from additional DLNA enabled devices. The DLNA management console circuit may be further configured to manage and/or monitor the new DLNA network.

In some embodiments of the present invention, the DLNA device circuit may be configured to temporarily or permanently attach the portable electronic device to the existing DLNA network and/or the new DLNA network.

Although some embodiments of the present invention have been discussed above primarily with respect to portable electronic device embodiments, management consoles and methods of operating DLNA enabled portable electronic devices are also provided.

DETAILED DESCRIPTION OF EMBODIMENTS OF THE INVENTION

The present invention will be described more fully hereinafter with reference to the accompanying figures, in which embodiments of the invention are shown. This invention may, however, be embodied in many alternate forms and should not be construed as limited to the embodiments set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like numbers refer to like elements throughout the description of the figures.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising," "includes" and/or "including" when used in this specification, specify the presence of stated features, integers, steps, operations, elements, and/or components, but do not preclude the presence or addition of one or more other features, integers, steps, operations, elements, components, and/or groups thereof. Moreover, when an element is referred to as being "responsive" or "connected" to another element, it can be directly responsive or connected to the other element, or intervening elements may be present. In contrast, when an element is referred to as being "directly responsive" or "directly connected" to another element, there are no intervening elements present. As used herein the term "and/or" includes any and all combinations of one or more of the associated listed items and may be abbreviated as "/".

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the disclosure. Although some of the diagrams include arrows on communication paths to show a primary direction of communication, it is to be understood that communication may occur in the opposite direction to the depicted arrows.

Some embodiments are described with regard to flowcharts in which each block represents a circuit element, module, or portion of code which comprises one or more executable instructions for implementing the specified logical function(s). It should also be noted that in other implementations, the function(s) noted in the blocks may occur out of the order noted. For example, two blocks shown in succession may, in fact, be executed substantially concurrently or the blocks may sometimes be executed in the reverse order, depending on the functionality involved.

For purposes of illustration and explanation only, various embodiments of the present invention are described herein in the context of a mobile terminal. It will be understood, however, that the present invention is not limited to such embodiments and may be embodied generally in any portable electronic device that includes is capable of being attached to a digital living network alliance (DLNA) that operates in accordance with at least one embodiment described herein.

As discussed in the background of the invention, DLNA defines three types of roles for devices in the DLNA network, a digital media renderer role, a digital media controller (control point) role and a digital media server role. A device having the digital media server role is a component capable of storing and sourcing media. A device that may have the digital media server role may be, for example, a set-top-box, a digital video recorder, or a personal computer (PC). A device having a digital media renderer role may be configured to show to the user the content provided to it by other devices. Devices configured as digital media controllers (control point role) can initiate activities as a third-party controller, for example, start the display of a media from a digital media server device on a digital media renderer device, i.e. control point devices are configrued to control how and where to render content that is provided by the server. A device can naturally assume one or more roles. For example, a device that is configured as both the renderer role and the control point may be termed a digital media player. Digital media players can acquire media from a digital media server and play (render) it to the user. A digital media player may be, for example, a television or a home theater system.

Some embodiments of the present invention provide a fourth role for DLNA devices as will be discussed herein. According to some embodiments of the present invention, some devices in the DLNA network may have a "management device" role. Devices having the management device role may be configured to manage access rights to the DLNA network, i.e., devices having the management device role may be configured to manage which devices are allowed to attach to the DLNA network and determine what the access rights for the DLNA network are. For example, devices having the management device role may provide configuration parameters to devices being attached. As discussed above, a device can have more than one role without departing from the scope of the present invention.

As will be discussed further below with respect to FIGS. 1 through 6, some embodiments of the present invention provide portable electronic devices, management consoles and methods of operating portable electronic devices in DLNA networks. As discussed herein, the interest for generic solutions for Home Networking, such as DLNA, has dramatically increased, and the first DLNA enabled home electronic devices have been introduced to the market. Thus, it can be assumed that the penetration of DLNA network will be rather high, and there may be a need for simple and flexible means to manage these DLNA networks.

Thus, according to some embodiments of the present invention, DLNA devices may have a "management role." As used herein, DLNA devices having the management role in accordance with some embodiments of the present invention are referred to as "management consoles." Thus, in accordance with some embodiments of the present invention, a DLNA enabled portable electronic device may be configured as a DLNA enabled device and/or as a DLNA management console. For example, the portable electronic device may be a DLNA device that can be attached to a DLNA network to, for example, be a data source for the DLNA network, such as a source for streaming audio. Furthermore, the DLNA device may include a DLNA management console circuit according to some embodiments of the present invention configured to operate the portable electronic device as a DLNA management console. The DLNA management console circuit may be configured to manage which devices are allowed to attach to the DLNA network and determine what the access rights for the DLNA network are. For example, the DLNA management console circuit may provide configuration parameters to devices being attached. Thus, in some embodiments of the present invention an "ad-hoc DLNA network" may be established around the portable electronic devices for temporary situations as will be discussed further herein with respect to FIGS. 1 through 6.

Figure 1:
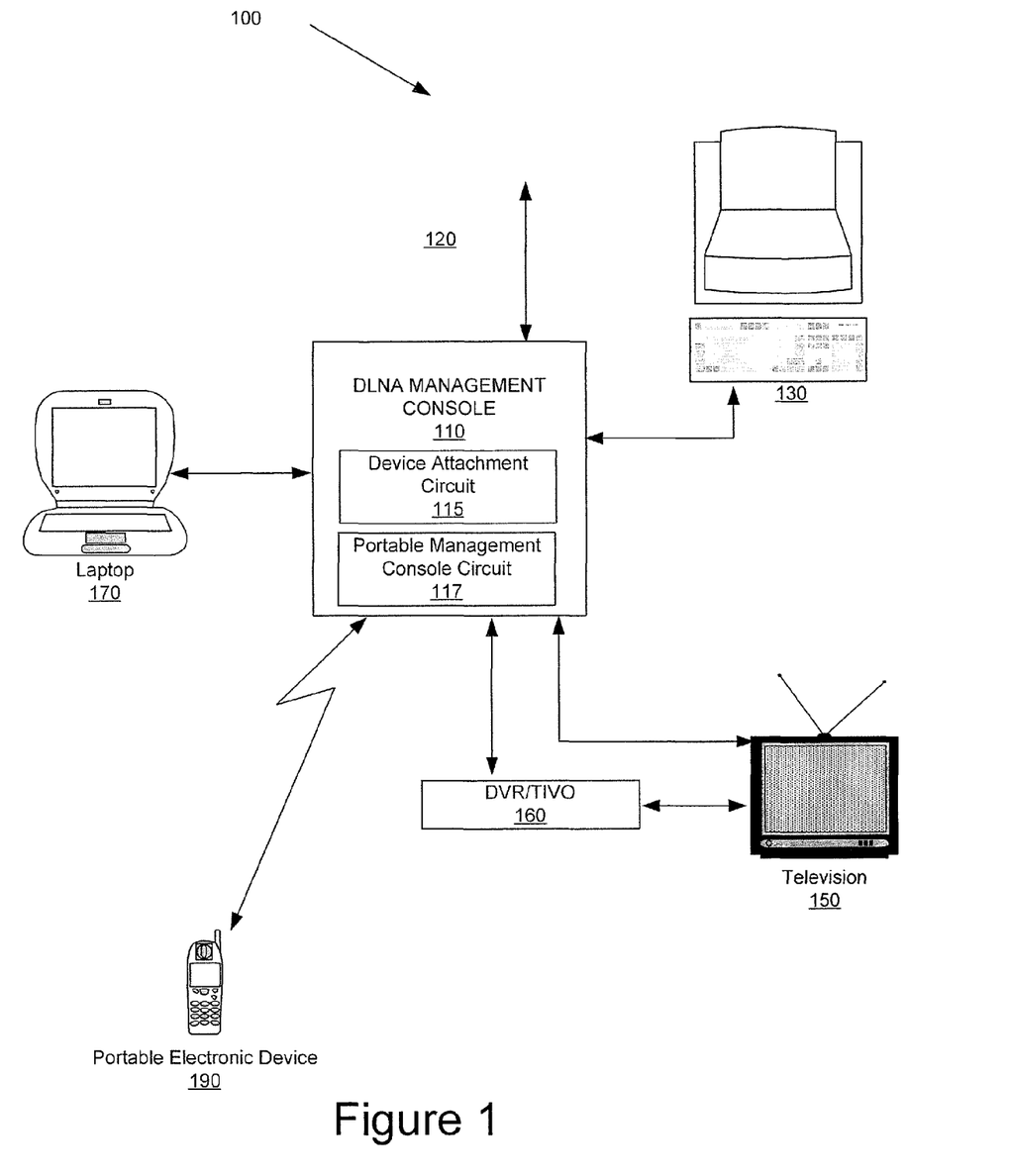
FIG. 1 is a schematic block diagram illustrating a digital living network alliance (DLNA) network including a DLNA management console and DLNA enabled portable electronic device according to some embodiments of the present invention.

Referring now to FIG. 1, a DLNA network 100 including a DLNA management console 110 and multiple DLNA enabled devices coupled to the DLNA management console 110 will be discussed. The main objective of DLNA is the establishment of a wired and wireless interoperable network of Personal Computers (PC), Consumer Electronics (CE) and mobile devices in the home and on the road, which may enable a seamless environment for sharing new digital media and content services. DLNA is focused on delivering an interoperability framework of design guidelines based on internationally recognized open industry standards together with a certification/logo program to officially verify and validate the conformance and interoperability of compliant products for the consumers. The details of DLNA are known to those having skill in the art and will therefore not be discussed in detail herein in the interest of brevity.

As illustrated in FIG. 1, the DLNA enabled devices in the network 100 include a personal computer 130, a television 150, a DVR/TIVO 160 and a laptop 170, all of which communicate with the DLNA management console 110 in accordance with some embodiments of the present invention. As further illustrated in FIG. 1, the network 100 also includes a DLNA enabled portable electronic device 190, for example, a mobile terminal, according to some embodiments of the present invention, which also communicates with the DLNA management console 110. The DLNA enabled devices 130, 150, 160 and 170 can communicate with the management console 110 wirelessly (WLAN). However, it will be understood that the connection may be any connection supporting IP and UpnP without departing from the scope of the present invention. As illustrated, the DLNA enabled portable electronic device 190 communicates with the DLNA management console 110 over a wireless link. Although embodiments of the present invention illustrated in FIG. 1 include a personal computer 130, a television 150, a DVR/TIVO 160, a laptop 170 and a portable electronic device 190 all of which communicate with the DLNA management console 110, embodiments of the present invention are not limited to this configuration. Any DLNA enabled device can be coupled to the DLNA management console 110 without departing from the scope of the present invention. For example, any device capable of storing and/or rendering audio and/or video image content may act as a DLNA device in accordance with some embodiments of the present invention.

Furthermore, although the DLNA enabled devices in FIG. 1 are illustrated as being coupled to the DLNA Management Console 110, the device may also be coupled to one or more of the other DLNA devices without departing from the scope of the present invention. For example, the PC 130 may be coupled to the DVR/TIVO 160.

As used herein, the term "portable electronic device" may include any device having a cellular and/or local access wireless technology. For example, a cellular radiotelephone with or without a multi-line display; a Personal Communications System (PCS) terminal that combines a cellular radiotelephone with data processing, facsimile and data communications capabilities; a Personal Data Assistant (PDA) that includes a radiotelephone, pager, Internet/intranet access, Web browser, organizer, calendar and/or a global positioning system (GPS) receiver; a gaming device, an audio video player, and a conventional laptop and/or palmtop portable computer that includes a radiotelephone transceiver. Any portable electronic device capable of operating in accordance with some embodiments of the present invention may be used without departing from the scope of the present invention.

As further illustrated in FIG. 1, the DLNA management console 110 includes a device attachment circuit 115 and portable management console circuit 117. Although only a single management console 110 is illustrated in FIG. 1, embodiments of the present invention may include two or more management consoles 110 without departing from the scope of the present invention. The device attachment circuit 115 may be configured to receive requests from a DLNA enabled portable electronic device 190 to attach the DLNA enabled portable electronic device 190 to the DLNA network 100 associated with the DLNA management console 110 so as to allow the portable electronic device 190 to be a source for data on the DLNA network.

As will be discussed further herein, according to some embodiments of the present invention, the DLNA enabled portable electronic device 190 may be permanently added (attached) to the DLNA network 100 or temporarily added to the DLNA network 100 as, for example, a guest device. The access rights for the DLNA portable electronic device 190 may be defined at the DLNA management console 110. The device attachment circuit may also be configured to remove a DLNA enabled device from and/or disable a DLNA enabled device in the DLNA network 100. The status of the DLNA network 100 and the attached devices may be viewed and changes via the management console 110.

Furthermore, the portable management console circuit 117 may be configured to provide rights to the DLNA enabled portable electronic 190 that allow the DLNA portable electronic device to operate as a portable management console for the DLNA network. Thus, in accordance with some embodiments of the present invention, DLNA enabled portable electronic devices 190 may be used as a portable management console for local or remote management of one or more DLNA networks 100 as will be discussed further herein.

In particular, in some embodiments of the present invention, the management console 110 may be included in the DLNA enabled portable electronic device 190 as will be discussed further with respect to FIG. 2. The portable management console circuit 117 may be configured to allow the DLNA enabled portable electronic device to attach to the DLNA network from a location remote from the DLNA network and act as a portable management console for the DLNA network from the remote location. Thus, in these embodiments of the present invention, the portable management console provided in the portable electronic device 190 may define a new DLNA network including the DLNA enabled portable electronic device 190, the portable management console may include the management console for the new DLNA network. The portable management console may then receive requests to attach to the new DLNA network from additional DLNA enabled devices, for example, additional portable electronic devices as will be discussed further with respect to FIG. 3.

Thus, according to some embodiments of the present invention, the DLNA management console 110 may provide a fourth role, the management device role, for DLNA networks. As discussed above, devices having the management device role, for example, a portable electronic device, may be configured to manage access rights to the DLNA network, i.e., devices having the management device role may be configured to manage which devices are allowed to attach to the DLNA network and determine what the access rights for the DLNA network are. For example, devices having the management device role may provide configuration parameters to devices being attached as discussed in detail herein.

Figure 2:
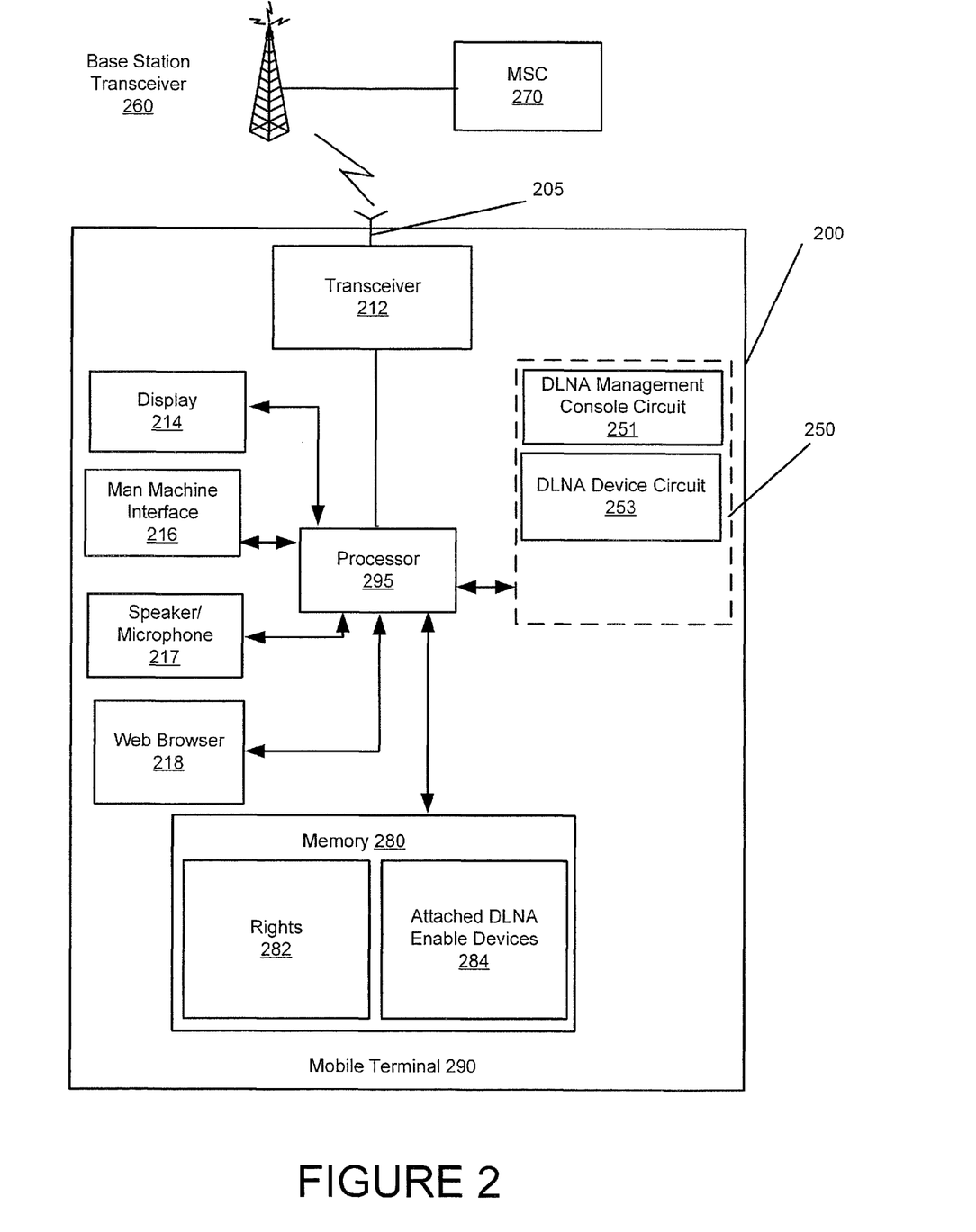
FIG. 2 is a schematic block diagram illustrating a DLNA enabled portable electronic device and a cellular communication system in accordance with some embodiments of the present invention.

Referring now to FIG. 2, details with respect to some embodiments of the DLNA enabled portable electronic device 190 of FIG. 1 will be discussed with respect to the mobile terminal of FIG. 2. FIG. 2 is a schematic block diagram illustrating a DLNA enabled portable electronic device 290 according to some embodiments of the present invention. As illustrated in FIG. 2, the portable electronic device 290 includes a portable housing 200 and may include a display 214, a man machine interface (MMI) 216, a speaker/microphone 217, a web browser 218, a transceiver 212 and a memory 280, any of which may communicate with a processor 295. Furthermore, portable electronic devices 290 according to embodiments of the present invention may further include a download control circuit 250 according to some embodiments of the present invention, which also communicates with the processor 295. The processor 295 can be any commercially available or custom microprocessor.

As further illustrated in FIG. 2, the portable electronic device 290 communicates with a base station transceiver 260 connected to a mobile switching center ("MSC") 270 in accordance with some embodiments of the present invention. The transceiver 212 typically includes a transmitter circuit and a receiver circuit, which respectively transmit outgoing radio frequency signals to the base station transceiver 260 and receive incoming radio frequency signals, such as voice and data signals, from the base station transceiver 260 via an antenna 205. The antenna 205 may be an embedded antenna, a retractable antenna or any antenna known to those having skill in the art without departing from the scope of the present invention. The radio frequency signals transmitted between the portable electronic device 290 and the base station transceiver 260 may include both traffic and control signals (e.g., paging signals/messages for incoming calls), which are used to establish and maintain communication with another party or destination. The processor 295 may support various functions of the portable electronic device, including a DLNA Circuit 250 configured to manage the addition and removal of DLNA enabled devices according to some embodiments of the present invention as will be discussed further herein.

It will be understood that in some embodiments of the present invention, the transceiver 212 may be a short range transceiver. The short range transceiver may be, for example, a Bluetooth transceiver, which may allow for high transfer rates of data over relatively short distances. It will be further understood that portable electronic devices 290 according to some embodiments of the present invention may include a wireless transceiver and a short range transceiver/transmitter.

In some embodiments of the present invention, the base station transceiver 260 includes the radio transceiver(s) that defines an individual cell in a cellular network and communicates with the portable electronic device 290 and other portable electronic devices in the cell using a radio-link protocol. Although only a single base station transceiver 260 is shown, it will be understood that many base station transceivers may be connected through, for example, a mobile switching center 270 and other devices to define a wireless communications network.

Although the present invention may be embodied in communication devices or systems, such as the portable electronic device 290, the present invention is not limited to such devices and/or systems. Instead, the present invention may be embodied in any apparatus that may be configured to attach to a DLNA network in accordance with embodiments of the present invention.

DLNA enabled portable electronic devices 290 in accordance with some embodiments of the present invention may have a versatile user interface (UI) and a versatile security toolbox. These portable electronic devices may also have a large set of communications means, for example, Bluetooth, infrared (IR), WiFi, WiMax, Internet access over Mobile Networks and the like. In other words, DLNA enabled portable electronic devices according to some embodiments of the present invention provide a useful platform for flexible management of DLNA networks as discussed herein.

As further illustrated in FIG. 2, the DLNA circuit 250 includes a DLNA management console circuit 251 and a DLNA device circuit 253. Although these circuits and modules are illustrated in FIG. 2 as separate circuits/modules, it will be understood that any of these circuits/modules can be combined or split into multiple circuits/modules without departing from the scope of the present invention. The functionality of each of the DLNA management console circuit 251 and a DLNA device circuit 253 will be discussed further herein.

In particular, the DLNA device circuit 253 is configured to attach the portable electronic device 290 to an existing DLNA network (100, FIG. 1) having at least one existing DLNA management console (110, FIG. 1) so as to allow the portable electronic device to be a source for data on the existing DLNA network. In particular, the DLNA device circuit 253 may be configured to transmit a request to the existing management console (110, FIG. 1) requesting that the portable electronic device be attached to the existing DLNA network as a DLNA device. As discussed above, the portable electronic device can be attached to the DLNA network permanently or temporarily without departing from the scope of the present invention.

The DLNA management console circuit 251 may be configured to enable the portable electronic device 290 to operate as a portable management console for the existing and/or a new DLNA network. In embodiments of the present invention where the portable electronic device operates as a "secondary" management console, i.e., in addition to the management console 110 of FIG. 1, the DLNA management console circuit 251 may be configured to transmit a request to the existing management console (110, FIG. 1) requesting that the portable electronic device 290 be given rights to act as a secondary management console for the existing DLNA network once the portable electronic device has been attached to the existing DLNA network as a DLNA device.

Thus, the existing DLNA network (100, FIG. 1) may be managed from the existing management console 110 and/or the secondary management console provided by the portable electronic device 290. The DLNA management console circuit 251 may be further configured to attach to the existing DLNA network from a location remote from the existing DLNA network and manage the existing DLNA network from the remote location. The DLNA management console circuit 251 may be configured to attach to the existing DLNA network from the remote location over the Internet using, for example, a wireless network and a DLNA proxy.

In embodiments of the present invention where the portable electronic device acts as the management console for a new DLNA network, i.e., the management console is an application running on the portable electronic device 290, the DLNA management console circuit 251 may be configured to define the new DLNA network including the DLNA enabled portable electronic device 290. Thus, the DLNA management console circuit 251 may be the portable management console for the new DLNA network. Once the new DLNA network is established, the DLNA management console 251 may be configured to receive requests to attach to the new DLNA network from additional DLNA enabled devices 284 as will be discussed further below with respect to FIG. 3. In these embodiments of the present invention, the DLNA management console circuit may be configured to manage and/or monitor the new DLNA network.

It will be understood that although each of the circuit and modules of the DLNA circuit 250 are discussed as being configured for specific tasks, these tasks may be combined into one circuit or module or split into additional circuits or modules without departing from the scope of the present invention.

Details in accordance with some embodiments of the present invention will now be discussed with respect to FIGS. 1 and 2. As discussed above, the existing network 100 includes an existing management console 110, for example, a personal computer, associated with the network 100. The DLNA enabled portable electronic device 190, 290 sends a request to the management console to be added to the network as a DLNA device. For example, the DLNA device circuit 253 of the portable electronic device 290 may send the request to the device attachment circuit 115 of the management console 110. Thus, the attached portable electronic device 190, 290 is initially "managed" from the existing management console 110, where the status of the network can be viewed, access rights 282 for the various devices can be managed and the like.

In some embodiments of the present invention, through the original management console 110 the portable electronic device 190, 290 may be give rights 282 to act as a secondary management console for the network 100. As such the portable electronic device 190, 290 may have two different roles within the network 100. In particular, the portable electronic device 190, 290 may be both a DLNA enabled device attached to the network 100 as well as a secondary management console for the network 100. Thus, in accordance with some embodiments of the present invention, the portable electronic device 190, 290 may have the capability to attach to the DLNA network 100 from a location remote from the DLNA network 100. For example, the portable electronic device 190, 290 may be configured to attach to the DLNA network 100 over the Internet using a wireless network and a DLNA proxy. Accordingly, some embodiments of the present invention may provide an ability to manage the DLNA network 100 from a remote location as discussed herein.

Figure 3:
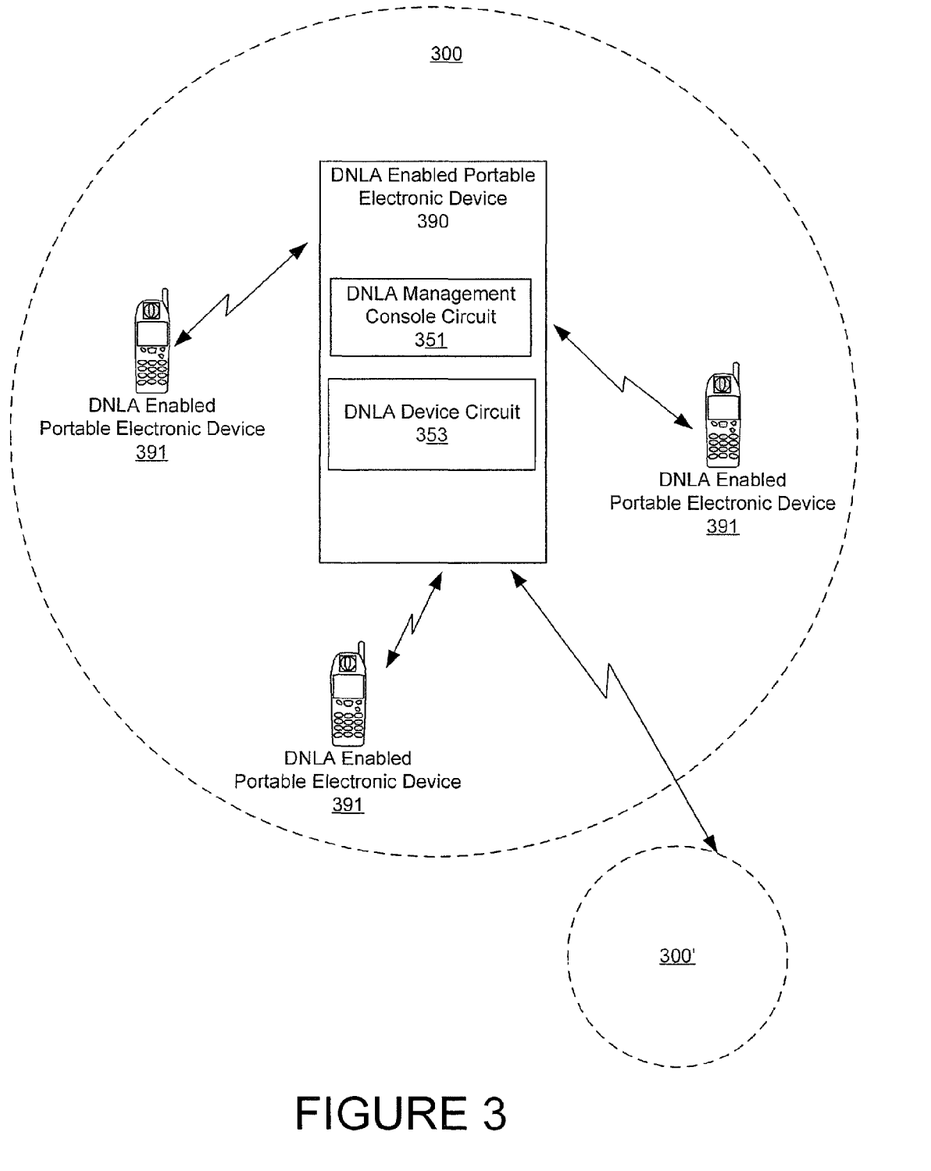
FIG. 3 is a schematic block diagram illustrating a DLNA network system including a portable electronic device configured as management consoler and a plurality of DLNA enabled devices according to some embodiments of the present invention.

Details with respect to some embodiments of the present invention will now be discussed with respect to FIGS. 2 and 3. FIG. 3 is a schematic block diagram illustrating a DLNA network 300 including a portable electronic device configured as management console 390 and a plurality of DLNA enabled devices 391 attached to the management console 390 according to some embodiments of the present invention. FIG. 3 further illustrates a second DLNA network 300'. The portable electronic device 390 serving as a management console in the first DLNA network 300 may only be a DLNA enabled device attached to the network 300'. Thus, the portable electronic device can be attached to more than one network 300, 300' in accordance with some embodiments of the present invention.

As illustrated in FIG. 3, the DLNA enabled portable electronic device 390 defines a new the DLNA network 300 that includes the DLNA-enabled device 390 having an integrated management console, i.e. having an application within the portable electronic device (DLNA management console circuit 351). As discussed above, the portable electronic device 390 is capable of managing, and thus being part of, more than one DLNA network 300, 300' and, therefore, it may be possible to establish flexible "ad-hoc DLNA networks" around the portable electronic device 390 for temporary situations as illustrated in FIG. 3.

In particular, additional DLNA enabled devices, for example, DLNA enabled portable electronic devices 391 of FIG. 3, may request to be added to the new DLNA network 300 where the portable electronic device acts as the management console for the new DLNA network 300 in accordance with the standard DLNA procedures for attaching devices. In these embodiments of the present invention, the portable electronic device 390 may be configured to monitor and manage the network 300 from the DLNA management console circuit 251 running the management console application in accordance with some embodiments of the present invention.

In some embodiments of the present invention, a logical connection between two DLNA networks may be provided. For example, a DLNA portable electronic device 391 maybe granted access to the DLNA network 300 by the management console 351 of the DLNA enabled portable electronic device 390. In other words, the portable electronic device 390 has the "management device" role in accordance with some embodiments of the present invention. In some embodiments, the user of the DLNA enabled portable electronic device 391 may access content in the user's network by means of a gateway concept.

Figure 4:
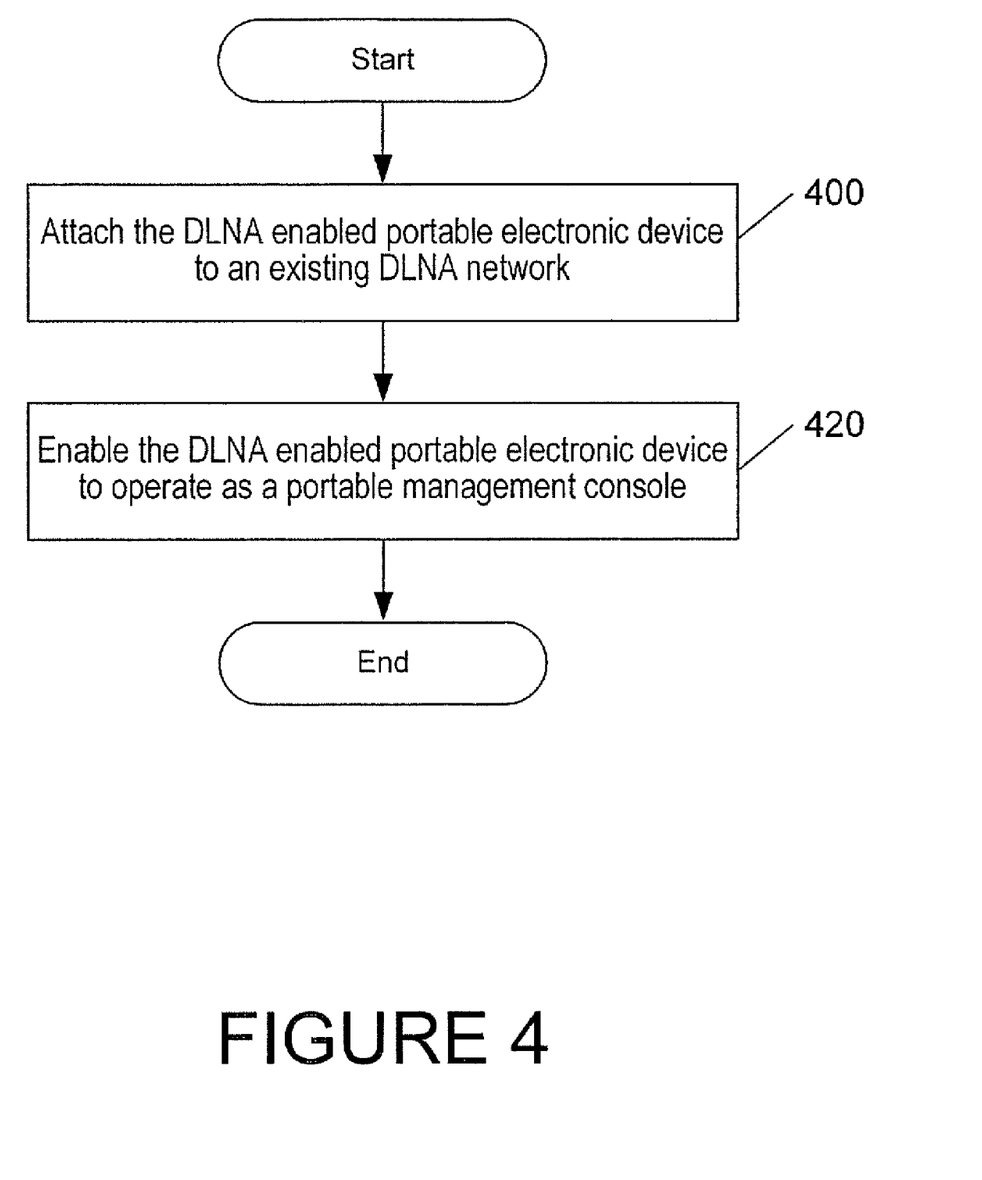
FIGS. 4 through 6 are flowcharts illustrating methods according to various embodiments of the present invention.
Figure 5:
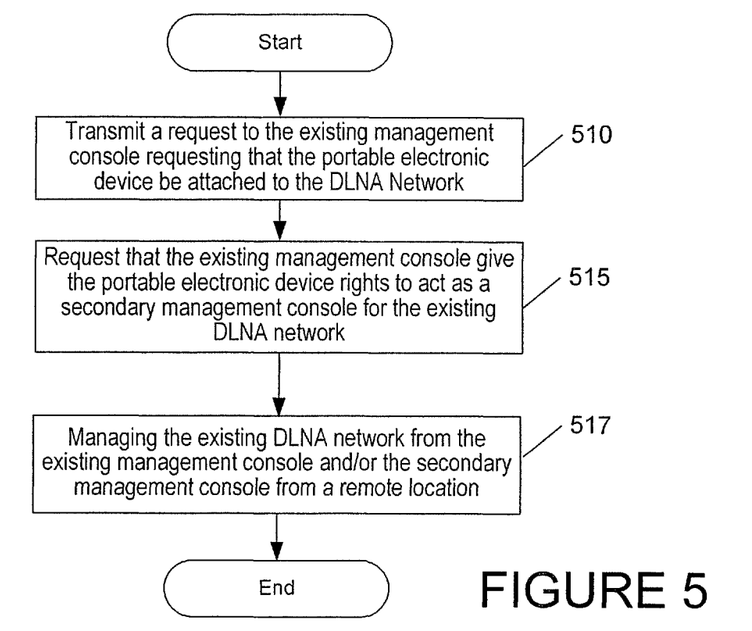
Figure 6:
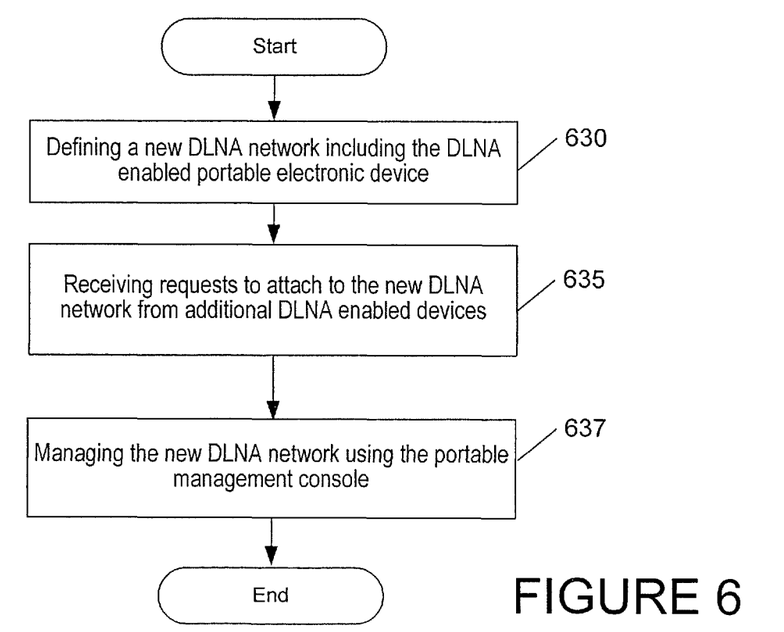

Referring now to FIGS. 4 through 6, methods for operating a DLNA enabled portable electronic device in a DLNA network in accordance with various embodiments of the present invention will be discussed. Referring first to FIG. 4, operations begin at block 400 by attaching the portable electronic device to an existing DLNA network having at least one existing DLNA management console so as to allow the portable electronic device to be a source for data on the existing DLNA network. In some embodiments, the portable electronic device may be enabled to operate as a portable management console for the existing and/or a new DLNA network (block 420).

Referring now to FIG. 5, a request may be transmitted to the existing management console requesting that the portable electronic device be attached to the existing DLNA network as a DLNA device (block 510). Once the portable electronic device is attached to the DLNA network, a request may be transmitted to the existing management console requesting that the portable electronic device be given rights to act as a secondary management console for the existing DLNA network (block 515). The existing DLNA network may be managed from the existing management console and/or the secondary management console from a local and/or remote location (block 517).

Referring now to FIG. 6, a new DLNA network may be defined including the DLNA enabled portable electronic device (block 630). The portable management console may be a management console for the new DLNA network. Requests may be received to attach to the new DLNA network from additional DLNA enabled devices (block 635). The new DLNA network may be managed and/or monitored using the portable management console (block 637).

In the drawings and specification, there have been disclosed exemplary embodiments of the invention. However, many variations and modifications can be made to these embodiments without substantially departing from the principles of the present invention. Accordingly, although specific terms are used, they are used in a generic and descriptive sense only and not for purposes of limitation, the scope of the invention being defined by the following claims.

That which is claimed:

1. A digital living network alliance (DLNA) enabled portable electronic device, comprising:
   a DLNA device circuit configured to attach the portable electronic device to an existing DLNA network having at least one existing DLNA management console so as to allow the portable electronic device to be a source for data on the existing DLNA network; and
   a DLNA management console circuit configured to enable the portable electronic device to operate as a portable management console for the existing and a new DLNA network.

2. The DLNA enabled portable electronic device of claim 1:
   wherein the DLNA device circuit is further configured to transmit a request to the existing management console requesting that the portable electronic device be attached to the existing DLNA network as a DLNA device; and
   wherein the DLNA management console circuit is further configured to transmit a request to the existing management console requesting that the portable electronic device be given rights to act as a secondary management console for the existing DLNA network once the portable electronic device has been attached to the existing DLNA network as a DLNA device.

3. The DLNA enabled portable electronic device of claim 2, wherein the existing DLNA network is managed from the existing management console and/or the secondary management console.

4. The DLNA enabled portable electronic device of claim 2, wherein the DLNA management console circuit is further configured to attach to the existing DLNA network from a location remote from the existing DLNA network and manage the existing DLNA network from the remote location.

5. The DLNA enabled portable electronic device of claim 4, wherein the DLNA management console circuit is configured to attach to the existing DLNA network from the remote location over the Internet using a wireless network and a DLNA proxy.

6. The DLNA enabled portable electronic device of claim 1, wherein the DLNA management console circuit is configured to define the new DLNA network including the DLNA enabled portable electronic device, wherein the DLNA management console circuit comprises the portable management console for the new DLNA network.

7. The DLNA enabled portable electronic device of claim 6, wherein the DLNA management console is further configured to receive requests to attach to the new DLNA network from additional DLNA enabled devices.

8. The DLNA enabled portable electronic device of claim 7, wherein the DLNA management console circuit is further configured to manage and/or monitor the new DLNA network.

9. The DLNA enabled portable electronic device of claim 1, wherein the DLNA device circuit is configured to temporarily or permanently attach the portable electronic device to the existing DLNA network and/or the new DLNA network.

10. A management console for a digital living network alliance (DLNA) network, comprising:
    an device attachment circuit configured to receive requests from a DLNA enabled portable electronic device to attach the DLNA enabled portable electronic device to the DLNA network associated with the DLNA management console so as to allow the portable electronic device to be a source for data on the DLNA network; and
    a portable management console circuit configured to provide rights to the DLNA enabled portable electronic that allow the DLNA portable electronic device to operate as a portable management console for the DLNA network.

11. The management console of claim 10, wherein the management console is included in the DLNA enabled portable electronic device.

12. The management console of claim 11, wherein the portable management console circuit is further configured to allow the DLNA enabled portable electronic device to attach to the DLNA network from a location remote from the DLNA network and manage the DLNA network from the remote location.

13. The management console of claim 11, wherein the portable management console circuit is configured to define a new DLNA network including the DLNA enabled portable electronic device, wherein the portable management console comprises the management console for the new DLNA network.

14. The management console of claim 13, wherein the portable management console circuit is further configured to receive requests to attach to the new DLNA network from additional DLNA enabled devices.

15. A method of operating a digital living network alliance (DLNA) enabled portable electronic device in a DLNA network, comprising:
    attaching the portable electronic device to an existing DLNA network having at least one existing DLNA management console so as to allow the portable electronic device to be a source for data on the existing DLNA network; and
    enabling the portable electronic device to operate as a portable management console for the existing and a new DLNA network.

16. The method of claim 15:
    wherein attaching further comprises transmitting a request to the existing management console requesting that the portable electronic device be attached to the existing DLNA network as a DLNA device; and wherein enabling further comprises transmitting a request to the existing management console requesting that the portable electronic device be given rights to act as a secondary management console for the existing DLNA network once the portable electronic device has been attached to the existing DLNA network as a DLNA device.

17. The method of claim 16, further comprising managing the existing DLNA network from the existing management console and/or the secondary management console from a local and/or remote location.

18. The method of claim 15, wherein enabling further comprises defining the new DLNA network including the DLNA enabled portable electronic device, wherein the portable management console comprises a management console for the new DLNA network.

19. The method of claim 18, further comprising receiving requests to attach to the new DLNA network from additional DLNA enabled devices.

20. The method of claim 19, further comprising managing and/or monitoring the new DLNA network using the portable management console.

* * * * *

UNITED STATES PATENT AND TRADEMARK OFFICE
CERTIFICATE OF CORRECTION

| | | |
|---|---|---|
| PATENT NO. | : 7,954,133 B2 | Page 1 of 1 |
| APPLICATION NO. | : 12/024353 | |
| DATED | : May 31, 2011 | |
| INVENTOR(S) | : Stavenow et al. | |

It is certified that error appears in the above-identified patent and that said Letters Patent is hereby corrected as shown below:

On the Title Page:
Item (74) Attorney: Please correct "Myer Bigel Sibley & Sajovec"
to read -- Myers Bigel Sibley & Sajovec --

Signed and Sealed this
Eighteenth Day of October, 2011

David J. Kappos
*Director of the United States Patent and Trademark Office*